No. 871,189. PATENTED NOV. 19, 1907.
L. SCHÜLER.
ALTERNATING CURRENT MOTOR.
APPLICATION FILED APR. 22, 1904.

2 SHEETS—SHEET 1.

WITNESSES:
INVENTOR
Leo Schüler.
BY
ATTORNEYS

No. 871,189.

PATENTED NOV. 19, 1907.

L. SCHÜLER.
ALTERNATING CURRENT MOTOR.
APPLICATION FILED APR. 22, 1904.

2 SHEETS—SHEET 2.

WITNESSES

INVENTOR
Leo Schüler
BY
ATTORNEYS

UNITED STATES PATENT OFFICE.

LEO SCHÜLER, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

No. 871,189.

Specification of Letters Patent.

Patented Nov. 19, 1907.

Application filed April 22, 1904. Serial No. 204,373.

*To all whom it may concern:*

Be it known that I, LEO SCHÜLER, a subject of the Emperor of Germany, residing at the city of St. Louis, in the State of Missouri, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to alternating-current induction motors, and more specifically to means for reversing the direction of rotation of such motors. It is applicable to a number of different forms of motors, but more particularly to single-phase motors of the self-starting variety in which one of the members is provided with a winding the currents in which are commuted at starting to produce definite armature magnetic poles. I provide such a motor with a subdivided field winding, the organization or electrical connections of which may be modified at the will of the operator to reverse the direction of movement of the rotary member of the motor.

Figure 1:
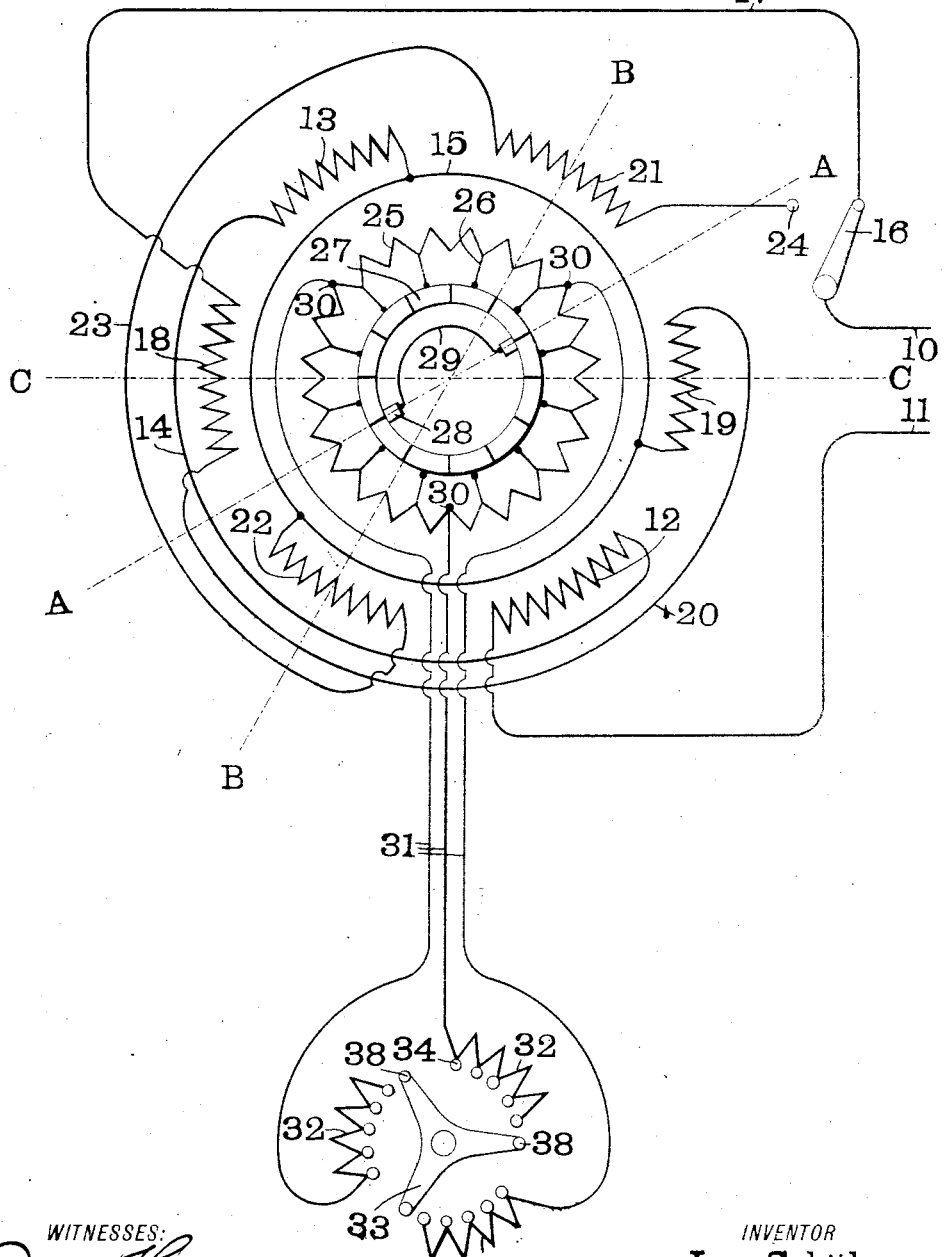
Figure 2:
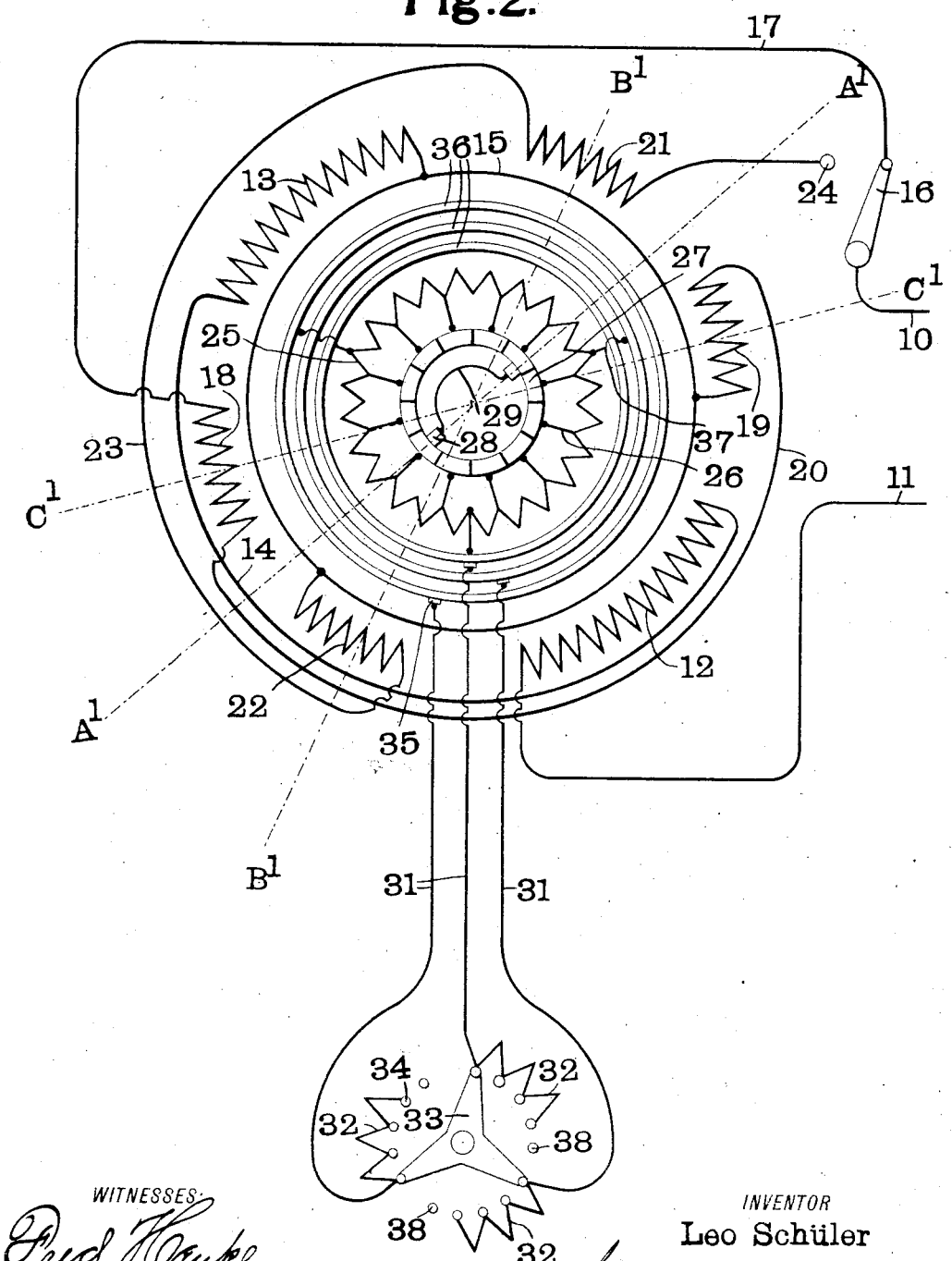

In the drawings, in which like characters of reference refer to similar parts in the different views, Figure 1 represents in diagram a type of induction motor embodying my invention; and Fig. 2 is a diagram of a modified form of my invention.

Referring first to Fig. 1, 10 and 11 indicate the mains through which single-phase alternating current is supplied from an external source to the stationary member or field of the motor. The winding of this field is divided into three groups; each group being divided into two coils. One of these groups is composed of the coils 12 and 13. One end of the coil 12 is connected to the main 11, and the other end is connected, by a conductor 14, to one of the ends of the coil 13. The opposite end of the coil 13 is connected to the conductor 15. It will thus be seen that the two coils of this group are connected in series. 16 is a switch, by means of which the main 10 may be electrically connected with the conductor 17. This conductor 17 is connected with one of the coils 18 of the second group constituting the field winding. The coil 18 is connected in series with the coil 19 by means of a conductor 20. The coil 19 is also connected with the conductor 15. The third and last group constituting the field winding is composed of the coils 21 and 22 which are connected in series by means of the conductor 23. 24 is a contact point within the reach of the switch 16 and connected with the coil 21. The coil 22 is connected with the conductor 15. It will thus be seen that the field winding of the motor is composed of three sections; said sections being all connected together at a common point—the conductor 15—after the manner of the ordinary star connection commonly employed in polyphase circuits.

Referring now to the rotary member or armature of the motor which, in the particular form shown in the drawings, is also the induced member, it is composed of a winding connected by means of leads 26 to the 25 segments 27 of a commutator. Brushes 28 bear upon this commutator, and are connected by means of a conductor 29 which may be of any resistance desired. From equidistant points 30 in the winding 25 are led conductors 31. These conductors are connected with the three divisions 32 of a resistance. 33 is a pivoted member provided with arms adapted to move over the contacts 34, connected to the resistance 32, to gradually exclude said resistance from the armature circuit. 38 are open circuit contacts adjacent to the contacts 34. When the motor is started, as hereinafter described, the arm 33 rests upon the contacts 38, thereby opening the circuit through the conductors 31.

Referring now to Fig. 2, it will be seen that the field of the motor there shown differs from the field of the motor shown in Fig. 1 only in that the coils 18, 19, 21, and 22 are of less length than the coils 12 and 13. The connections of the coils are identical with those described in connection with Fig. 1. The arrangement of the resistance 32 with respect to the armature is also somewhat different from that shown in Fig. 1 in that the three conductors 31 are connected to brushes 35 which bear upon slip rings 36. Each of the three slip rings 36 is connected by a conductor 37 with the windings 25 of the armature. This arrangement is evidently of advantage where, as shown in the drawings, the member of the motor, to which this resistance is connected, is a rotary member since it permits the resistance 32 to be stationary and to be located external to and at a distance from the motor, thus facilitating regulation of the motor speed at the will of the operator.

In the operation of my invention, and referring first to Fig. 1, it will be evident that when the switch 16 and the brushes 28 are in the positions there shown, the poles of the armature will lie in substantially the position indicated by the dotted line A A, and that, as the coils 12, 13, 18, and 19 are in active operation and the coils 21 and 22 are excluded from circuit, the field generated by said active coils will have its axial line substantially coincident with the line B B. Under these circumstances the motor will start from rest and rotate in a given direction with a torque dependent upon the angular displacement of the line B B from the line A A. Should, however, the switch 16 rest upon the contact 24, the coils 21 and 22 would be cut into circuit and the coils 18 and 19 excluded from circuit. As the coils 12 and 13 are permanently connected in circuit the axis of the resulting field would lie substantially in the position indicated by the dotted line C C. The position of the brushes remaining the same, it is evident that the motor would now be rotated in a direction opposite to that at which it would rotate were the coils 18 and 19 in circuit. It is thus evident that the direction of rotation of my motor may be reversed at will.

The operation of the motor shown in Fig. 2 is substantially identical with that above described. Owing, however, to the fact that the coils 12 and 13 are of greater length than the coils 18, 19 and 21, 22 the angular displacement of the axial lines B′ B′ and C′ C′ of the field poles from the axial line A′ A′ of the armature poles is less than the angular displacement of the corresponding lines in Fig. 1. This results in a variation of the torque. A further advantage of this construction is that as one of the sets of coils 18, 19 or 21, 22 remains idle during a portion of the time, I am enabled by reducing the length of these coils to diminish the amount of idle winding in the motor field.

It will, of course, be understood that I prefer to start my motor with the arm 33 in the position shown in Fig. 1, thereby opening the circuit through the resistance 32. After the motor has received an initial rotation, the arm 33 is rotated to first include and then gradually exclude the resistance 32 from circuit and thus short circuit the windings 25 of the motor. When this is done the arm 33 occupies the position shown in Fig. 2 and the brushes 28 are practically excluded from any active participation in the operation of the motor. It will, of course, be understood that by cutting the resistance 32 into and out of circuit the speed of the motor may be regulated.

What I claim as new is:

1. In a motor, the combination with a member provided with a circuit for producing definite poles therein, of a second member provided with a main conductor, an auxiliary conductor for said second member and adapted to coöperate with said main conductor, and means for cutting said auxiliary conductor into or out of effective operation to shift the poles of said second member relative to the poles of said first named member.

2. In a motor, the combination with a member provided with a circuit for producing definite poles therein, of a second member provided with a main conductor, an auxiliary conductor for said second member and adapted to coöperate with said main conductor, and means for cutting said auxiliary conductor into or out of effective operation to shift the poles of said second member from one side to the other of the poles of said first named member.

3. In a motor, the combination with a member provided with a circuit for producing definite poles therein, of a second member provided with a main conductor, an auxiliary conductor for said second member of different magnetic effect from said main conductor and adapted to coöperate with said main conductor, and means for cutting said auxiliary conductor into or out of effective operation to shift the poles of said second member relative to the poles of said first named member.

4. In a motor, the combination with a member provided with a circuit for producing definite poles therein, of a second member provided with a main conductor, an auxiliary conductor for said second member of less magnetic effect than said main conductor and adapted to coöperate with said main conductor, and means for cutting said auxiliary conductor into or out of effective operation to shift the poles of said second member relative to the poles of said first named member.

5. In a motor, the combination with a member provided with a circuit for producing definite magnetic poles therein, of a second member having a main conductor, auxiliary conductors for said second member adapted to coöperate with said main conductor, and means for cutting one of said auxiliary conductors into effective operation and another of said auxiliary conductors out of effective operation to shift the poles of said second member relative to the poles of said first named member.

6. In a motor, the combination with a member provided with a circuit for producing definite magnetic poles therein, of a second member having a main conductor, auxiliary conductors for said second member adapted to coöperate with said main conductor, and means for cutting one of said auxiliary conductors into effective operation, and the other of said auxiliary conductors out of effective operation to shift the poles of said second member from one side to the other of the poles of said first named member.

7. In an electric motor, a member provided with a circuit, a second member provided with a main conductor permanently in circuit and composed of a plurality of diametrically opposite sections, auxiliary conductors for said member and each composed of a plurality of sections situated between the sections of said main conductor, and means for cutting one or another of said auxiliary conductors into effective operation.

8. In an electric motor, a member provided with a circuit, a second member provided with a main conductor permanently in circuit, a plurality of auxiliary conductors for said second member, and means for cutting one or another of said auxiliary conductors into effective operation, said conductors being all connected together at a common point.

9. In combination, an alternating-current motor having main field coils and two sets of auxiliary field coils, a rotor winding for said motor having a commutator and brushes, said brushes being placed on the line of magnetization produced by said main field coils, and means for energizing either set of auxiliary coils.

10. In combination, an alternating-current motor having main field coils and two sets of auxiliary field coils, a rotor winding having a commutator and brushes, said brushes being placed on the line of magnetization produced by said main coils, and a switch adapted to connect either set of auxiliary coils in series with said main coils.

11. In combination, an alternating-current motor, a rotor winding therefor having a commutator and brushes, main field coils arranged to magnetize said motor on the line of said brushes, two sets of auxiliary coils arranged to produce magnetization at an angle to that of said main coils, and a switch adapted to connect either of said sets in series with said main coils and means for energizing either of said sets.

12. In combination, an alternating-current motor, main field coils therefor, auxiliary field coils on either side of said main coils, and a switch adapted to connect in series with said main coils the auxiliary coils on either side thereof.

In testimony whereof, I have hereunto set my hand and affixed my seal, in the presence of the two subscribing witnesses.

LEO SCHULER. [L. S.]

Witnesses:
L. B. BEACH,
D. C. BETJEMAN.